(12) United States Patent
Roche et al.

(10) Patent No.: US 7,350,511 B1
(45) Date of Patent: Apr. 1, 2008

(54) FUEL VAPOR CONTROL SYSTEM

(75) Inventors: Ronald H. Roche, Cass City, MI (US); Mark S. Swanson, Cass City, MI (US)

(73) Assignee: Walbro Engine Management, L.L.C., Tucson, AZ (US)

( * ) Notice: Subject to any disclaimer, the term of this patent is extended or adjusted under 35 U.S.C. 154(b) by 24 days.

(21) Appl. No.: 11/183,667

(22) Filed: Jul. 18, 2005

(51) Int. Cl.
*F02M 33/02* (2006.01)

(52) U.S. Cl. ............... 123/518; 123/516; 123/519

(58) Field of Classification Search .......... 123/516, 123/518, 519, 520
See application file for complete search history.

(56) References Cited

U.S. PATENT DOCUMENTS

| | | | |
|---|---|---|---|
| 3,748,829 A * | 7/1973 | Joyce et al. ............ 95/146 |
| 4,028,075 A * | 6/1977 | Roberge ............... 96/139 |
| 4,572,394 A * | 2/1986 | Tanahashi et al. ...... 220/86.2 |
| 4,727,955 A * | 3/1988 | Honda et al. .......... 180/296 |
| 4,785,612 A | 11/1988 | Morishita et al. |
| 4,787,643 A * | 11/1988 | Shirata ............... 280/834 |
| 4,884,716 A * | 12/1989 | Steiner .............. 220/202 |
| 4,925,465 A * | 5/1990 | Liskey ............... 96/147 |
| 4,942,723 A | 7/1990 | Wassell |
| 5,060,620 A * | 10/1991 | Oslapas ............... 123/519 |
| 5,111,900 A * | 5/1992 | Leitermann .......... 180/69.4 |
| 5,122,172 A | 6/1992 | Sherwood et al. |
| 5,581,986 A | 12/1996 | Calver |
| 5,687,697 A * | 11/1997 | Ishikawa ............. 123/520 |
| 5,704,337 A * | 1/1998 | Stratz et al. .......... 123/519 |
| 5,718,209 A * | 2/1998 | Scardino et al. ....... 123/519 |
| 5,787,693 A | 8/1998 | Dyke |
| 5,884,460 A | 3/1999 | Serravalle et al. |
| 5,894,833 A * | 4/1999 | Kikuchi et al. ........ 123/516 |
| 6,182,693 B1 * | 2/2001 | Stack et al. ......... 137/565.17 |
| 6,237,574 B1 | 5/2001 | Jamrog et al. |
| 6,256,886 B1 | 7/2001 | Legrand |
| 6,269,802 B1 * | 8/2001 | Denis et al. .......... 123/519 |
| 6,273,070 B1 * | 8/2001 | Arnal et al. .......... 123/519 |
| 6,367,457 B1 * | 4/2002 | Mancini et al. ........ 123/516 |
| 6,463,915 B2 * | 10/2002 | Ozaki et al. .......... 123/519 |
| 6,467,464 B2 * | 10/2002 | Burke et al. .......... 123/520 |
| 6,474,312 B1 * | 11/2002 | Zulauf et al. ......... 123/518 |
| 6,503,301 B2 | 1/2003 | Uchino et al. |
| 6,698,475 B2 * | 3/2004 | Schaefer et al. ....... 141/325 |
| 6,701,902 B2 | 3/2004 | Koyama et al. |
| 7,047,948 B2 * | 5/2006 | Gerhardt et al. ....... 123/516 |
| 7,048,140 B1 * | 5/2006 | Caldwell ............. 220/371 |
| 7,086,389 B2 * | 8/2006 | Yamada .............. 123/516 |
| 7,100,580 B2 * | 9/2006 | Lin et al. ............ 123/516 |
| 7,104,258 B2 * | 9/2006 | Yamada et al. ........ 123/516 |
| 7,134,426 B2 * | 11/2006 | Uchino et al. ........ 123/518 |
| 7,201,155 B2 * | 4/2007 | Mills ................ 123/520 |
| 2005/0178368 A1 * | 8/2005 | Donahue et al. ....... 123/520 |

* cited by examiner

*Primary Examiner*—Thomas Moulis
(74) *Attorney, Agent, or Firm*—Reising, Ethington, Barnes, Kisselle, P.C.

(57) ABSTRACT

A system for reducing escape to the atmosphere of hydrocarbon fuel vapors from a fuel tank for a combustion engine powered device including at least one functional member that directly communicates with the fuel tank and is constructed to receive and retain hydrocarbon vapors therein. The functional member may further include a bed of activated carbon-based material for adsorbing and purging of the hydrocarbon vapors. The functional member is otherwise useful to the device beyond the vapor handling function and may be incorporated into a handlebar assembly, frame component, housing, cover, and the like thereby reducing component parts and reducing cost and complexity of the device.

23 Claims, 4 Drawing Sheets

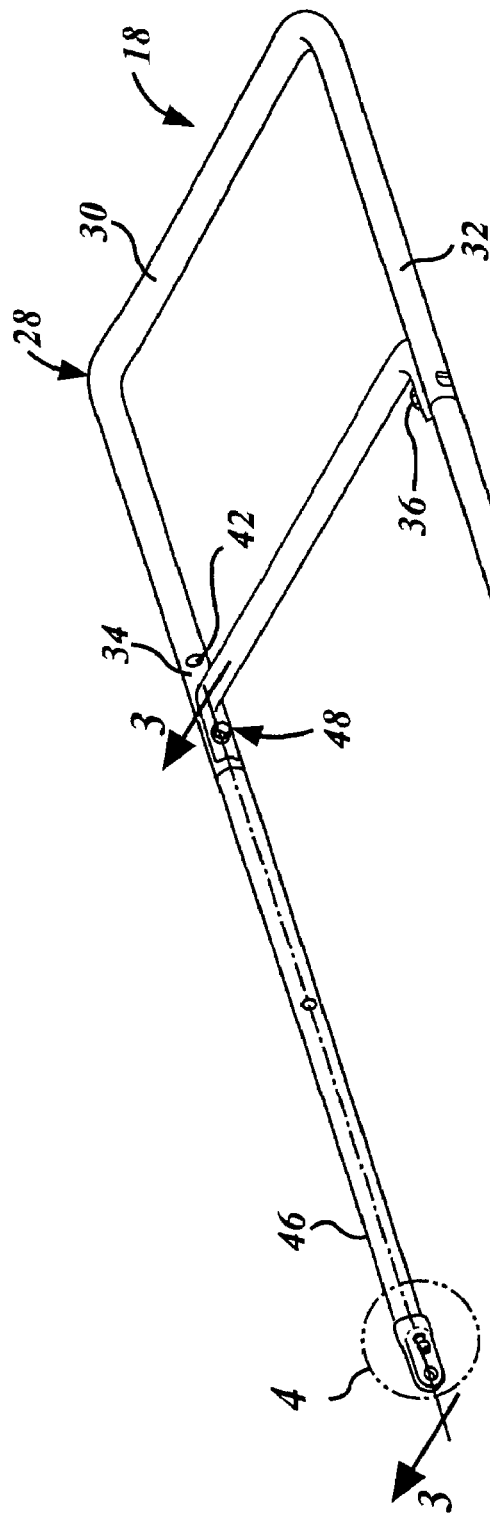
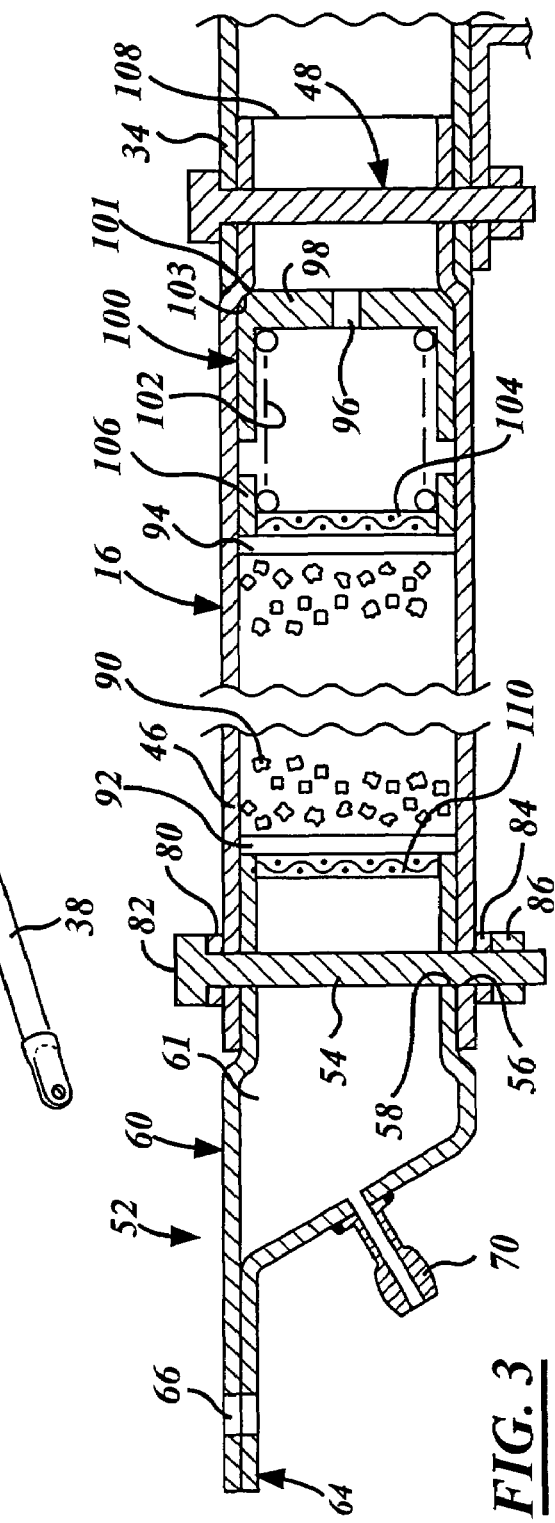

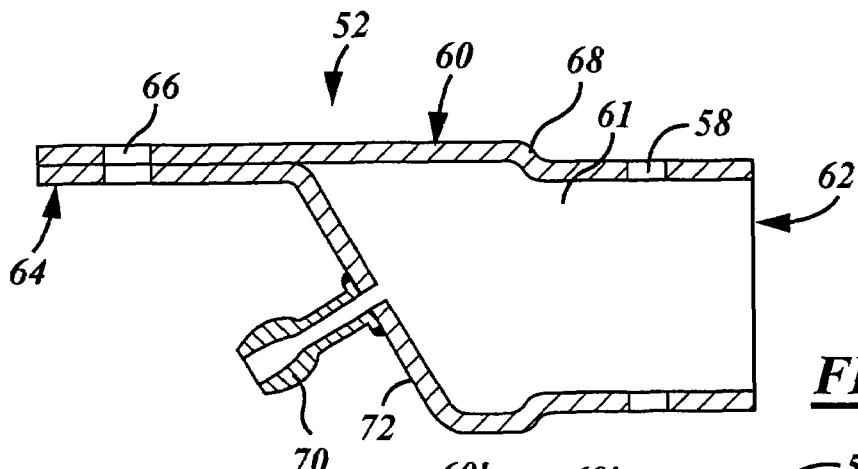
*FIG. 6A*
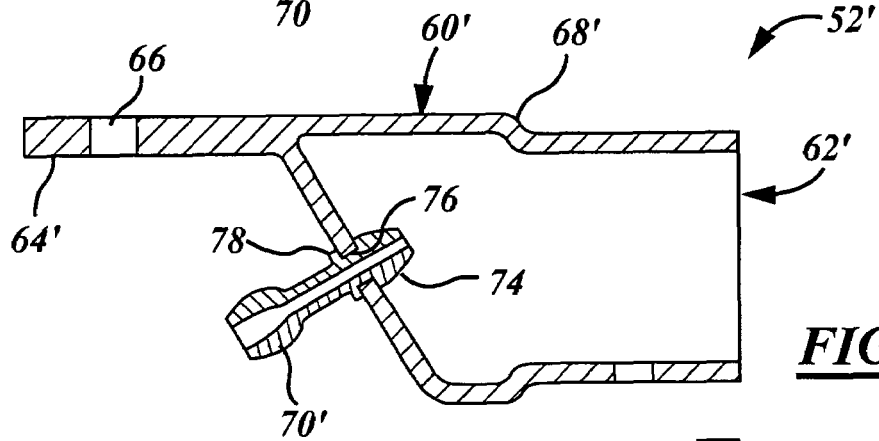
*FIG. 6B*
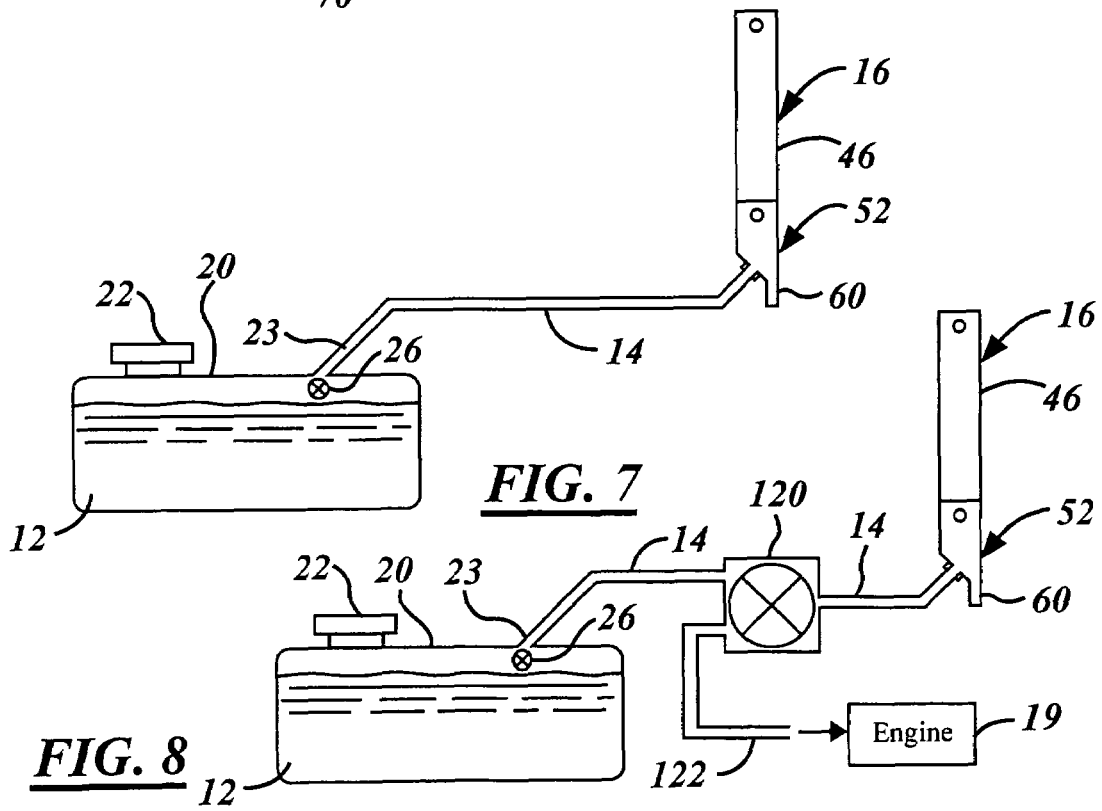
*FIG. 7*
*FIG. 8*

FUEL VAPOR CONTROL SYSTEM

FIELD OF THE INVENTION

The present invention relates to controlling fuel evaporative emissions, and more particularly, to a system for reducing hydrocarbon fuel vapor emissions from a fuel system.

BACKGROUND OF THE INVENTION

Many devices, such as lawn mowers, weed trimmers, leaf blowers, and the like, are powered by hydrocarbon fuel burning engines. Due to their relatively high volatility, hydrocarbons quickly vaporize from the liquid fuel. Such hydrocarbon vapors can escape to the atmosphere from a fuel tank or other fuel system components. Increasingly, the evaporative emissions of such devices are being strictly regulated by various governments and agencies. Large, costly fuel vapor venting components and storage systems typically are not practical for small engine applications.

SUMMARY OF THE INVENTION

A vapor treatment system for treating hydrocarbon fuel vapors from a combustion engine powered device including at least one functional member that directly communicates with a fuel tank of the device, and is constructed to receive and retain or hold hydrocarbon fuel vapors therein. The functional member may further include a bed of activated carbon-based material for storing or releasably retaining the hydrocarbon vapors. The functional member is otherwise useful to the apparatus beyond the vapor handling function and may be incorporated into a handlebar assembly, frame component, housing, cover, and the like thereby reducing component parts and reducing cost and complexity.

The vapor treatment system may further include a vent line that communicates a tubular member having a carbon-based bed with a fuel tank of the device. The vapor vent permits fuel vapors to flow out of the fuel tank to the tubular member comprising the carbon-based material for environmental treatment thereof.

At least some objects, features and advantages of some embodiments of the invention include providing a fuel vapor treatment system for combustion engine powered devices, such as lawn mowers for example, that is cost efficient, does not require any additional structural parts, and effectively treats hydrocarbon fuel vapor emissions to thereby prevent vapors from being emitted into the atmosphere from the fuel tank, is durable, reliable, of relatively simple design and economical manufacture and assembly, and in service has a long useful life.

BRIEF DESCRIPTION OF THE DRAWINGS

These and other objects, features and advantages of this invention will be apparent from the following detailed description of the preferred embodiments and best mode, appended claims and accompanying drawings in which:

FIG. 2 is an enlarged perspective view of the handlebar assembly of the lawn mower of FIG. 1;

FIG. 3 is an enlarged fragmentary cross-sectional view of a first embodiment of a connector body and carbon canister of the handlebar taken along line 3-3 of FIG. 2;

FIG. 6A is a sectional view taken along line 6A-6A of FIG. 4;

FIG. 6B is a sectional view of a modified connector body;

FIG. 7 is a schematic view of a passive purge arrangement of the hydrocarbon vapor emissions system;

FIG. 8 is a schematic view of an active purge arrangement of the hydrocarbon vapor emissions system;

DETAILED DESCRIPTION OF THE PREFERRED EMBODIMENTS

Figure 1:
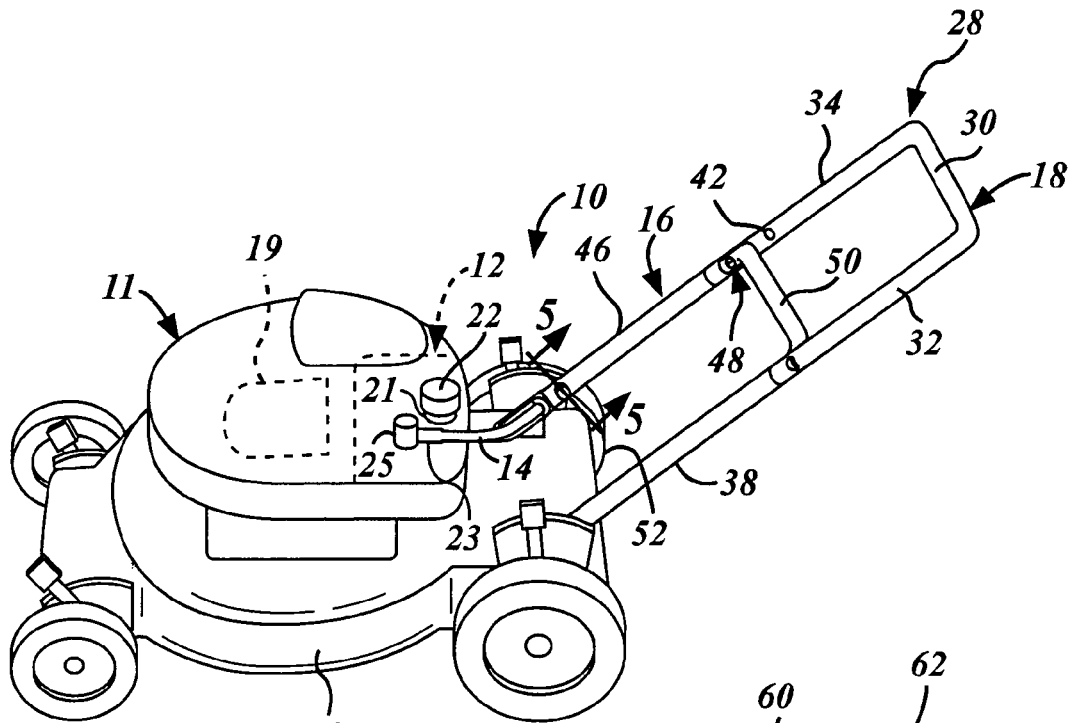
FIG. 1 is a perspective view of a walk-behind lawn mower including a handlebar assembly with a carbon canister.
Figure 4:
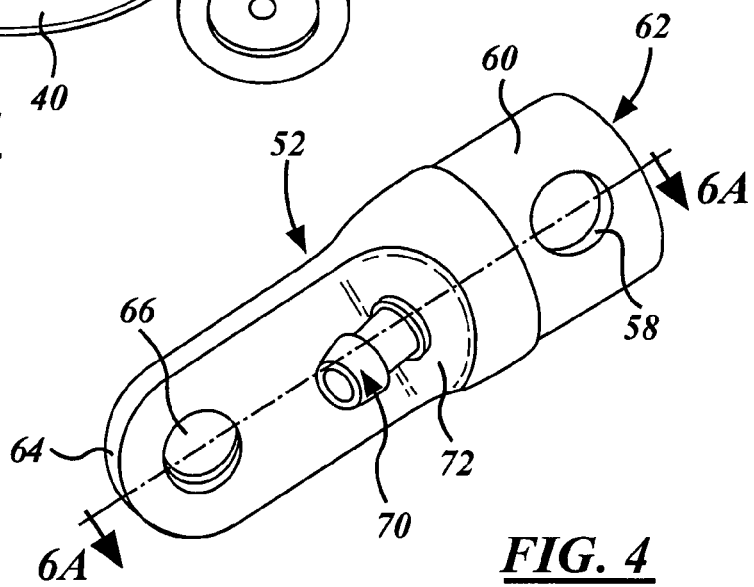
FIG. 4 is a perspective view of the connector body of the carbon canister.

Referring in more detail to the drawings, FIG. 1 illustrates a first embodiment of a vapor emissions treatment system 10 for a fuel-powered walk-behind lawn mower 11 that has a fuel tank 12 communicating with a vapor canister 16 that preferably is incorporated into an existing and otherwise functional portion of the mower 11, such as a handlebar assembly 18. The vapor or carbon canister 16 as they are sometimes called, may be disposed within or form part of the handlebar assembly 18. The carbon canister 16 can otherwise replace a tubular member on the lawn mower 11, and preferably houses a carbon-based bed of material for effectively adsorbing or absorbing hydrocarbon-based fuel vapors. Once in the canister 16, the hydrocarbon vapors may be desorbed or purged from the canister 16 and routed back into the fuel tank 12 or directed to a fuel burning engine 19.

The fuel tank 12 may be of a conventional design such as blow molded or vacuum formed plastic with a suitable shape for the specific engine application for which the fuel tank 12 will be used, such as for a rotary lawn mower as described herein. As shown in FIG. 1, the fuel tank 12 comprises a generally rounded rectangular shape and has a fill spout 21 closed by a removable fuel cap 22. When the fuel tank 12 is filled with a relatively volatile fuel, such as gasoline, and capped with the fuel cap 22, some of the fuel relatively quickly begins to vaporize thereby increasing the pressure inside the fuel tank 12. As the volume of the fuel vapor increases the pressure within the fuel tank 12 increases if the tank is not vented. Even without a vent, hydrocarbon vapors can escape from the fuel tank 12 through non-sealed areas and permeate through unsealed areas or gap such as between the fuel cap 22 and the spout 21 in the top 20 of the fuel tank 12, and may more slowly permeate through the fuel tank walls and fuel lines.

To reduce the level of fuel vapors that permeate and escape from the fuel tank 12, a flexible vapor line 14 connects to the fuel tank 12 to the canister 16 to route the hydrocarbon vapors to the canister 16 for storage therein. The vapor line preferably communicates with the tank through a valve 26 which is preferably located near the top of and in the fuel tank 12. The valve 26 preferably prevents the flow of liquid fuel to the canister 16 even if the lawnmower is significantly tilted or inverted, and permits fuel vapors to pass through it at least when the lawnmower is in its normal operating orientation or attitude (e.g. not significantly tilted or inverted). The valve may be of the type disclosed in pending U.S. patent application Ser. No.

10/955,795 filed Sep. 30, 2004, which is incorporated herein by reference in its entirety. The valve 26 may open in response to increased pressure inside the fuel tank 12, or may be normally open and closed only when acted on by liquid fuel.

In general, carbon canisters include a bed of porous carbon-based material received within a canister housing, where hydrocarbon vapors are removed from, adsorbed or absorbed by the carbon-based material and relatively hydrocarbon free air can be discharged from the canister. After removal or adsorption of the hydrocarbon vapors, the relatively hydrocarbon free air can then be vented to the atmosphere. When the engine is running with the throttle at least partially open, the pressure drop produced in the fuel tank tends to create an air or vapor flow from the carbon canister toward the fuel tank 12 which desorbs or removes the hydrocarbon fuel vapors from the carbon material. The vapors are then routed back into the fuel tank 12 or to the engine 19 for use in powering the engine.

Figure 5:
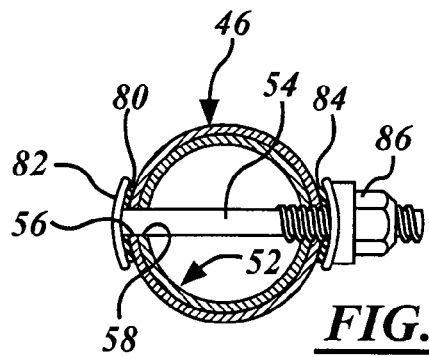
FIG. 5 is a cross-sectional view of the connector body taken along line 5-5 in FIG. 1.

As best shown in FIGS. 1 and 2, the handlebar assembly 18 is tubular and includes a U-shaped handle section 28 having a laterally extending handle 30 and a pair of transverse legs 32, 34 extending from each end of the handle 30. One leg 32 is connected by a nut and bolt 36 to a straight extension tube 38 which is connected at its other end to a blade housing 40 (FIG. 1) of the lawn mower 11. The other leg 34 preferably includes a vent hole 42 open to the atmosphere and is received over a reduced diameter end 108 of a tubular casing 46 and connected thereto by a nut and bolt 48. The vent 42 could be on either leg 34 or 32, and a vent in leg 32 may produce better results and require a smaller canister. The vent also could be disposed in other locations as desired. A cross bar 50 preferably extends between and is connected to each of the legs 32, 34 preferably by the bolts 36, 48. The casing 46 is connected at its other end to a connector body 52 which in turn is connected to the blade housing 40. As shown in FIG. 5, a bolt 54 is disposed through an opening 56 in the casing 46 and an opening 58 in the connector body 52 to connect them together upstream adjacent one end of the casing 46.

As best shown in FIGS. 2-4 and 6A, the connector body 52 comprises a tubular metal body 60 having a passage 61, an open end 62, and a generally closed end 64 with a through hole 66. The open end 62 has a diameter sized so that it fits within the casing 46 of the canister 16 and preferably has a shoulder 68 engaged by an end of the casing 46. The closed end 64 of the connector body 52 preferably is formed by compressing the tubular structure of the body 60. The body 60 of the connector body 52 has a metal fitting 70 that preferably is welded to the outer surface 72 of the body 60, and is designed to mate with one end of the vent line 14 to communicate the vent line with the passage 61. Alternatively and as shown in FIG. 6B, the connector body 52' can be formed in one piece with a solid integral end 64' by investment or die casting or by injection molding. The body 60' and the open end 62' preferably are substantially the same as the similar sections of the body 60 as shown in FIG. 6A. A metal fitting 70' may have a head 74 that is press fit through an opening 76 and a stop flange 78 that limits insertion of the fitting 70' into the opening 76. The fitting 70' communicates the vent line 14 with the canister 16.

Since hydrocarbon vapors will be present within the casing 46 and connector body 52, 52' as best shown in FIGS. 3 and 5, a seal 80 or washer preferably is disposed between a head 82 of the bolt 54 and body 46, and another seal 84 or washer preferably is disposed between a nut 86 received on the bolt 54 and the body 46. The seals 80, 84 restrict or prevent the escape to the atmosphere of hydrocarbon vapors. The seals 80, 84 preferably are formed of an elastomer such as a high durometer elastomer such as EPDM, Viton, Buna N or the like and may be coated on, carried by or separate from the bolt 54 and nut 86.

In reference now to FIG. 2, the carbon canister 16 is defined in part by or carried in or by the casing 46 which preferably is a hollow, elongated cylindrical metal tube with an interior that defines a chamber in which a bed of activated carbon-based material 90 is received. The casing 46 is preferably straight and elongated to create a longer flow path for distribution of hydrocarbon vapors through the canister 16 for better carbon bed utilization and less flow restriction. As defined herein, activated carbon refers to a highly porous carbon-based structure that exhibits relatively high adsorption and desorption efficiencies of organic compounds from gases and liquids. It is preferable that the casing 46 be relatively long with its cross-sectional diameter smaller than its length and preferably equal to or less than ¼ of its length. Preferably, the casing 46 or a chamber in the casing has a volume suitably sized based of fuel type, temperature change, absorption capacity of specific carbon and required amount of carbon, and by way of example and without limitation, may be from between 30 cc and 100 cc, and more preferably of about 40 to 60 cc for retaining the activated carbon. Desirably the chamber or casing 46 has a volume that is at least ⅟₅₀ of the volume of the fuel tank 12. In one presently preferred embodiment, the activated carbon particles are pellets and may be any carbon-based material suitable for a carbon canister as is known to one skilled in the art.

As shown in FIG. 3, to retain the carbon material 90 while permitting gaseous flow into and out of the canister, retainer discs 92, 94 are disposed at the opposed ends of the carbon bed and preferably are formed of a mesh or an open cell foam or other material permitting hydrocarbon vapor and air to freely flow therethrough. The disc 92 retains and traps carbon granules or pellets to prevent contamination of the fuel tank 12, and the disc 94 disposed on the other end of the canister 16 is used to prevent carbon granules or pellets from flowing into the atmosphere through an air vent hole 96.

The air vent hole 96 is formed through a bottom surface 98 of a plastic plug or cup 100 which preferably has a chamfered edge 101 adapted to engage a shoulder 103 of the casing 46. The cup 100 retains a biasing member such as spring 102 that is disposed within the canister 16. The spring 102 provides a compression load on the carbon material to secure the carbon bed 90 inside the body 46 of the canister 16 and to reduce vibration and movement of the carbon material 90 which tends to break down the carbon pellets or granules structure. The spring 102 may act on the disc 94 through a more rigid back-up disc, or screen 104 that permits free or substantially unrestricted gaseous flow. The screen 104 may have an axially extending flange 106 to guide it within the body 46.

At one end 108 the casing 46 preferably is slightly reduced in diameter to an outer diameter approximately equal to the inner diameter of the adjacent tubular leg 34 of the handlebar assembly 18. Thus, the canister 16 is assembled to the handlebar assembly 18 by sliding the end 108 of the body 46 inside the leg 34 of the handlebar assembly 18 and connecting them together with the bolt 48 as previously described.

During assembly, the plastic cup 100 is inserted into the casing 46, bottom 98 first, and the spring 102 is inserted thereafter. The back up disc 104 is then inserted into the casing, followed by the disc 94. A predetermined volume of activated carbon material 90, preferably in pellet form, is poured into the casing 46 and then the other disc 92 and a backup disc 110 are placed in the casing 46 and the connector body 52 is then inserted into the casing 46 of the canister 16 and bears on the disc 110 to compress the carbon bed 90 into a tight pack by compressing the spring 102.

In use, fuel vapors flow from the fuel tank 12 and into the canister 16 by way of the vent line 14, fitting 70, connector body passage 61 and casing 46 in which the carbon material 90 is contained. Hydrocarbon vapors are adsorbed by the carbon material 90 and relatively hydrocarbon free air is permitted to vent from the carbon canister through the air vent hole 96 that communicates with the atmosphere through the vent hole 42 in the leg 34 of the handlebar assembly. In this manner the fuel tank 12 is vented to the atmosphere only through the canister 16.

The canister 16, may be purged of hydrocarbons either passively or actively. The term "passive purging" refers to the process of removing captured hydrocarbon fuel vapor from the canister 16 by natural means such as by gravitational forces or by a pressure drop between, for example, the fuel tank 12 and the canister 16. A passively purged system for the present invention is shown in FIG. 7. As the pressure inside the fuel tank 12 increases, the valve 26 opens and allows fuel vapors to pass through the hose 14 and into the carbon canister 16 via the connector body 52. When a subatmospheric pressure exists inside the tank, the valve 26 opens and air from the atmosphere flows through the air vents 42, 96 and desorbs the hydrocarbons from the carbon bed 90. The hydrocarbons then flow back into the fuel tank 12 and may subsequently be used to power the engine of the lawn mower 11. Typically, these pressure changes relative to the surrounding atmospheric pressure are produced by temperature changes such as diurnal temperature changes.

For an actively purged system, as shown in FIG. 8, a purge control valve 120 is disposed in the vent line 14 to selectively communicate the vent line 14 with a purge line 122 that preferably communicates with an intake manifold or other low pressure engine intake. The term "active purging" refers to the process where captured fuel vapor in the canister 16 is drawn out of the canister 16 by a pressure gradient generated between the purge line 122 and the canister 16. Fuel vapor is purged from the canister 16 by opening the solenoid operated valve 120 (which could be pneumatically or otherwise actuated) to communicate the reduced pressure signal through the purge line 122 to the canister 16. Air is drawn in through the canister vent 96, down through the bed 90 and desorbs the fuel vapor therefrom. The fuel vapor can be delivered either to the engine 19 for combustion or back into the fuel tank 12, for example.

Figure 9:
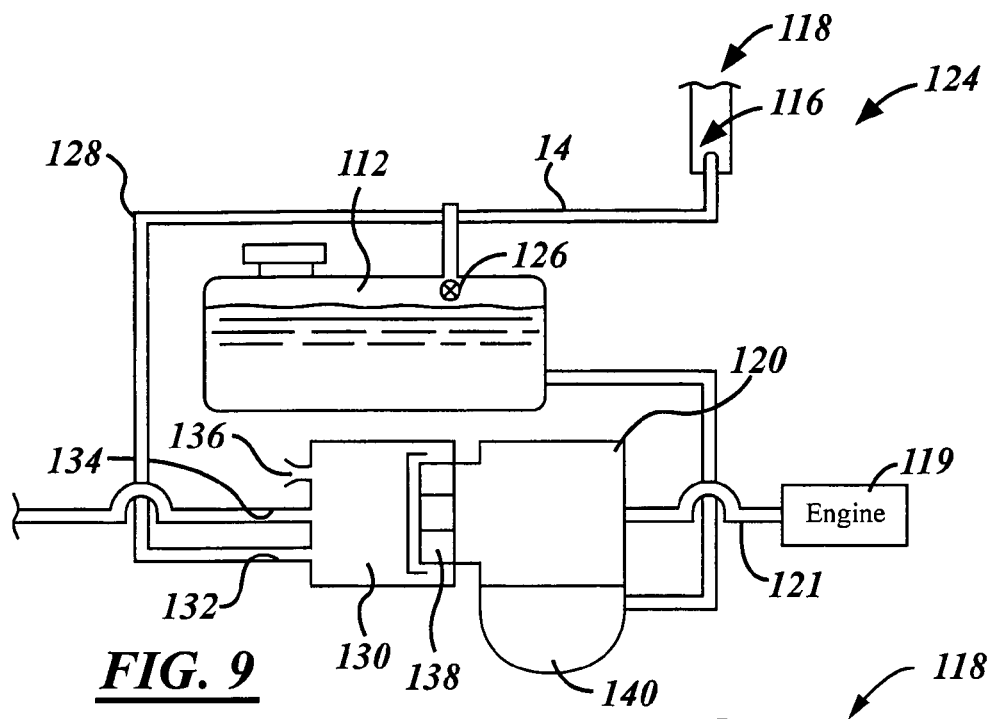
FIG. 9 is a schematic view of a second embodiment of an evaporative emissions treatment system.

FIG. 9 is a schematic representation of a second vapor emissions treatment system 124 for a walk-behind lawn mower (not shown) which includes a fuel tank 112 having a vent line 14 attached thereto that communicates with a support tube 116 of a handlebar assembly 118. The support tube 116 defines a suitable volume (inner diameter (ID) and length) or container for capturing and retaining hydrocarbon vapors. The vapors may then be purged from the support tube 116 by a vacuum generated by or in a carburetor 120 and used for powering an internal combustion engine 119.

Figure 10:
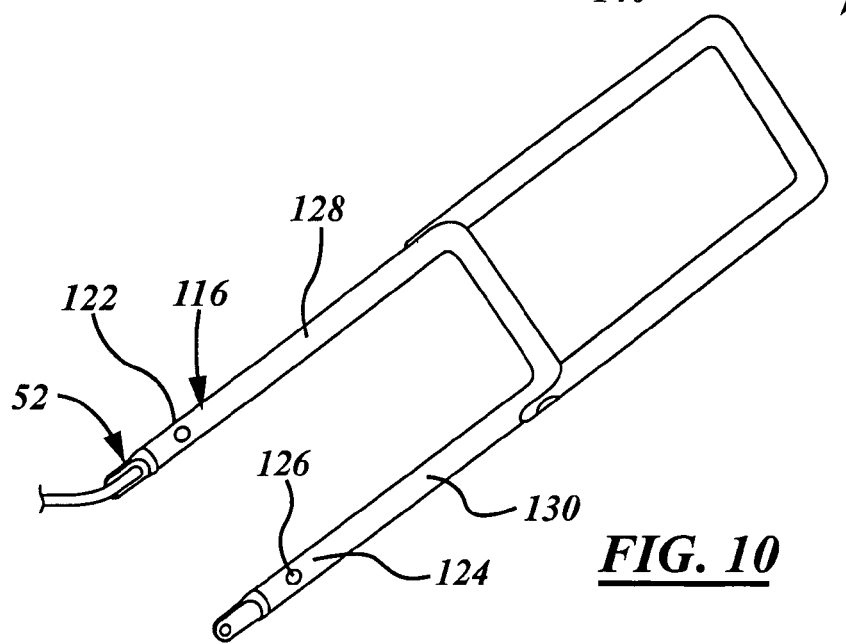
FIG. 10 is a perspective view of a handlebar assembly for the evaporative emissions treatment system of FIG. 9.

As shown in FIG. 10, the support tube 116 of the handlebar assembly 118 houses or stores hydrocarbon vapors therein. The tube 116 is generally U-shaped and includes a first end 122 sealed from the atmosphere with a connector body 52, 52' therein and a second end 124 including a vent hole 126. The tube 116 is designed having a specific internal diameter (ID) and length (volume) suitable for capturing and retaining or holding all or substantially all of the hydrocarbon vapors emitted from the fuel tank 112. The vent line 14 is attached to the fitting 70, 70' of the connector body 50, 52'.

The ID and the length of the tube 116 preferably are determined according to certain assumptions or design conditions relating to anticipated volumes of fuel vapor that must be captured or accounted for. One representative tube 116 has an ID of 0.75 inches and length of 54 inches, thereby providing a total volume of 127.2 cubic inches. In a fuel tank with a capacity of 0.5 gallons, or 115.5 cubic inches, a change in volume of about 8.8 cubic inches will occur over a 24-hour temperature change of 40° F. from 65° F. to 105° F. Since the volume of the fuel tank itself does not change, the expanded volume of 8.8 cubic inches of vaporized fuel must exit the fuel tank. The expansion of the vapor thus produces a slow gas flow within the tube 116. With this slow flow and since hydrocarbons are heavier than air, the hydrocarbon vapors generally will remain in the handlebar tube 116 until a first upwardly inclined leg 128 becomes filled. Theoretically, in a 24-hour period the temperature will increase for some time and then decrease. The cooling down period will cause some retraction of the volume of vapor from the tube 116 and some return flow to the fuel tank 112. Because a portion of the vapor has actually changed state from liquid to vapor and not all of the vapor will condense back to liquid form, a true reversible process is not achieved and thus some of the hydrocarbon vapors will remain in the tube 116. Once the first vertical leg 128 becomes saturated and likewise a second vertical leg 130 becomes saturated, hydrocarbon vapors may escape to the atmosphere through the vent hole 126. To prevent hydrocarbon vapors from escaping to the atmosphere in the event that the handlebar tube 116 becomes completely saturated, activated carbon may be disposed within the vertical leg 130 of the tube 116 near the air vent hole 126 to adsorb hydrocarbons prior to gaseous discharge to the atmosphere.

Figure 11:
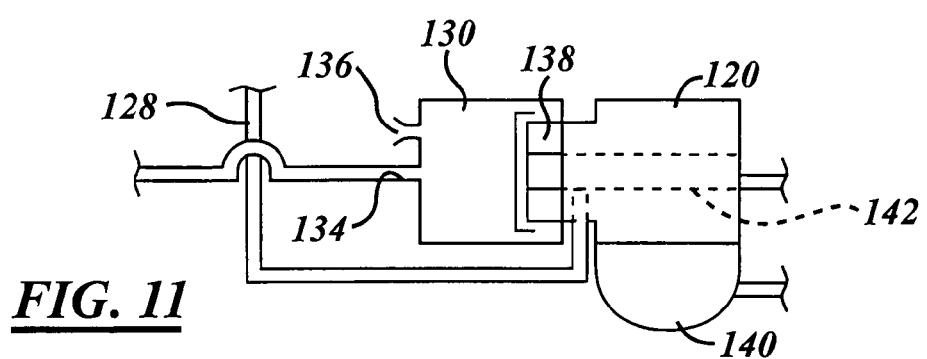
FIG. 11 is a schematic view of a modified evaporative emissions treatment system.

With reference again to FIG. 9, the hydrocarbon vapors that are captured inside the handlebar tube 116 may be purged by a low or subatmospheric pressure generated in the area of or communicated with the tube 116. The low pressure may be generated by the operating engine to pull air from the atmosphere through the vent hole 126 and into the tube 116. The low pressure also draws the hydrocarbon vapors captured in the tube 116 out of the tube 116 and into the vent line 14. The vapors pass through a vapor channel formed in a roll-over valve 126 and into a purge hose 128. The hydrocarbon vapors are then drawn into an air cleaner housing 130 through a hydrocarbon vapor port 132, while air from the atmosphere is also drawn into the housing 130 through an air port 134 via the subatmospheric pressure generated by the operating engine. An orifice 136 is provided in the air cleaner housing 130 to control the pressure drop therein. Since hydrocarbon vapors are heavier than air, the hydrocarbon vapors will tend to stay toward the bottom of the housing 130, while the air will rise to the top. While separated, the hydrocarbon vapor and air pass through an air cleaner 138 and are then drawn into the carburetor 120, where they are mixed with liquid fuel delivered from a carburetor bowl 140 supplied with liquid fuel from the fuel tank 112. The air/fuel mixture is then fed into the engine 119 for combustion thereof. Alternatively, as shown in FIG. 11, the hydrocarbon vapors in the purge hose 128 may be fed into the mixing passage 142 of the carburetor 120 instead of the air cleaner housing 130.

Accordingly, fuel vapor from the fuel tank preferably is stored in an existing functional member of the combustion engine powered apparatus that preferably includes an existing chamber, such as the interior of the casing 46, in which the vapor may be received. The existing functional member of the apparatus may include one or more, or a portion of the following, by way of examples without limitation: a frame component, a housing, a handlebar assembly, a handle, a cowling, a cover, a bracket, a tank, a support, a wheel, and the like. By providing the vapor storage, with or without a bed of carbon material, in an existing functional member of the apparatus, the size and shape of the apparatus is not changed, the function of its components is not changed, a separate housing for vapor storage is not needed, and a relatively closed loop and contained vapor control system can be provided.

While the forms of the invention herein disclosed constitute presently preferred embodiments, many others are possible. It is not intended herein to mention all the possible equivalent forms or ramifications of the invention. It is understood that terms used herein are merely descriptive, rather than limiting, and that various changes may be made without departing from the spirit and scope of the invention as defined by the following claims.

The invention claimed is:

1. A fuel vapor handling system of a fuel system for a device with a fuel powered combustion engine, comprising:
    a combustion engine;
    a fuel tank in which a supply of fuel is maintained for the engine and having a vent; and
    a frame component, housing, handlebar assembly, handle, or support of the device having a wall, which is separate and spaced from the fuel tank and the engine of the device and the same wall defines at least in part an interior of a chamber which communicates with the vent to receive and at least temporarily retain hydrocarbon fuel vapors therein and also performs a structural function of the device other than being part of the fuel system or its fuel vapor handling system.

2. The system of claim 1 which also comprises carbon-based material disposed in the chamber.

3. The system of claim 1 wherein said chamber is longer than it is wide and has a volume of about 30 cc to 100 cc.

4. The system of claim 1 wherein said chamber has a volume determined as a function of the volume of the fuel tank and expected temperature change.

5. The system of claim 1 wherein said at least one functional member includes an air vent communicating the chamber with the atmosphere.

6. The system of claim 1 further comprising a vapor vent line that communicates the chamber with the fuel tank, and a valve that communicates with the vapor vent line to selectively permit the flow of vapor from the tank to the vent line.

7. The system of claim 1 wherein vapor is purged from the chamber by a low pressure signal generated by the engine and communicated with the chamber.

8. The system of claim 1 wherein said vapor is purged from the chamber by a low pressure signal generated by a carburetor and communicated with the chamber.

9. The system of claim 2 which also includes vapor permeable retainers disposed on each side of the carbon-based material to retain the carbon-based material in the chamber while permitting gaseous flow therethrough.

10. The system of claim 9 which also includes a biasing member acting on one of the retainers to apply a compression force to the carbon-based material.

11. A fuel vapor handling system for a fuel powered device, comprising:
    a fuel tank in which a supply of fuel is maintained and having a vent; and
    a handlebar assembly with at least one tubular member defining at least part of a chamber which communicates with the vent to receive and at least temporarily retain hydrocarbon fuel vapors therein.

12. A vapor handling system for a walk-behind device powered by a combustion engine, comprising:
    a fuel tank in which a supply of fuel is maintained;
    a handlebar assembly including a handle portion and support legs extending from the handle portion;
    a chamber at least in part within the handlebar assembly and communicating with the fuel tank to receive and at least temporarily retain fuel vapors from the fuel tank; and
    a filter material in at least a portion of the chamber.

13. The vapor handling system of claim 12 wherein the chamber has a volume of about 30 cc to 100 cc and a width that is smaller than its length.

14. The vapor handling system of claim 12 further comprising a vapor vent line for communication between said chamber and said fuel tank, wherein said fuel tank comprises a valve that communicates with said vapor vent line to permit the flow of vapor out of the tank.

15. The vapor handling system of claim 14 further comprising a connector body of the handlebar assembly that has an attachment end for connection to an adjacent component and an open end communicating with said chamber.

16. The vapor handling system of claim 15 wherein said connector body includes a fitting element that is carried by said connector body for communication with said vapor vent line.

17. The vapor handling system of claim 15 wherein said attachment end is formed by pressing flat a tubular portion of the connector body.

18. The vapor handling system of claim 15 wherein said attachment end is formed by die casting.

19. The vapor handling system of claim 15 which also comprises two vapor permeable retainers disposed in the chamber with one or more on either side of the filter material and wherein said open end of the connector body engages one of the retainers in assembly.

20. The vapor handling system of claim 19 which also includes a biasing member that provides a force on the retainer not engaged by the connector body to provide a biasing force on the filter material.

21. The vapor handling system of claim 20 wherein the filter material includes a carbon-based material.

22. The vapor handling system of claim 12 wherein the chamber has a volume equal to at least $\frac{1}{50}$ of the volume of the fuel tank.

23. The vapor handling system of claim 12 wherein the chamber comprises a tubular body having a diameter and a length and the diameter is less than $\frac{1}{10}$ of the length.

* * * * *